United States Patent
Allen et al.

[11] 3,720,448
[45] March 13, 1973

[54] CUSHIONED TRACK WITH ANTI-SLIPPAGE MEANS

[75] Inventors: Norman R. Allen, Washington; Roger L. Boggs, East Peoria; Robert N. Stedman, Chillicothe, all of Ill.

[73] Assignee: Caterpillar Tractor Co., Peoria, Ill.

[22] Filed: Nov. 20, 1970

[21] Appl. No.: 91,488

[52] U.S. Cl..................................305/19, 152/182
[51] Int. Cl..............................................B60c 27/20
[58] Field of Search ....305/19, 56, 57; 152/187, 191, 152/182

[56] References Cited

UNITED STATES PATENTS

| | | | |
|---|---|---|---|
| 3,601,212 | 8/1971 | Peterson | 305/19 |
| 2,273,950 | 2/1942 | Galanot | 152/227 |
| 3,093,423 | 6/1963 | Adams | 305/56 |
| 2,859,067 | 11/1958 | Weier | 305/56 X |
| 3,612,624 | 10/1971 | Stedman | 305/19 |
| 2,821,443 | 1/1958 | Galanot | 305/56 |
| 2,755,146 | 7/1956 | Galanot | 305/56 X |
| 3,355,224 | 11/1967 | Skanes | 305/57 |

Primary Examiner—Richard J. Johnson
Attorney—Fryer, Tjensvold, Feix, Phillips & Lempio

[57] ABSTRACT

A resilient spacer means, such as a pneumatic rubber tire, has an endless track assembly circumferentially mounted thereon to form a cushioned track. The track assembly comprises an annular, articulated link assembly positioned on each side of the spacer means to closely couple a plurality of ground-engaging track shoes together. Each shoe has anti-slippage means secured thereto to imbed into the tread of the spacer means to prevent slippage thereof, relative to the track assembly, during cushioned track operation.

12 Claims, 8 Drawing Figures

INVENTORS
NORMAN R. ALLEN
ROGER L. BOGGS
ROBERT N. STEDMAN

BY

ATTORNEYS

INVENTORS
NORMAN R. ALLEN
ROGER L. BOGGS
ROBERT N. STEDMAN

CUSHIONED TRACK WITH ANTI-SLIPPAGE MEANS

BACKGROUND OF THE INVENTION

This invention relates to a wheel of the cushioned track type which is particularly adapted for use on earthworking vehicles.

The track assembly of a cushioned track occasionally tends to slip circumferentially, relative to the spacer means or tire on which it is mounted. Such slippage is due in large measure to the aggressiveness and efficiency of the cushioned track vehicle, regarding the wide variety of work tasks which can be undertaken therewith. The cushioned track is particularly susceptible to such slippage when operated over muddy terrain and the like.

One solution to the occasional slippage problem has been to increase the interference fit, as between the tire tread and contacting surface portions of the circumventing track shoes of the track assembly. When such interference fit is unduly high, the link assemblies of the track assembly are in turn placed in a high degree of tension. During certain phases of cushioned track operation, the pivot pins for the link assemblies are accordingly subjected to unduly high bearing loads which tend to score the pins.

SUMMARY AND OBJECTS OF THIS INVENTION

An object of this invention is to overcome the above, briefly described problems by providing anti-slippage means for a cushioned track which normally resists a tendency for the track assembly to slip circumferentially relative to the enveloped spacer means thereof. Such anti-slippage means does not interfere with normal cushioned track operation and, in fact, aids in continuously maintaining the desired substantially circumferentially continuous and polygonal-shaped surface contact between the track shoes of the track assembly and the contacting annular tread of the spacer means.

BRIEF DESCRIPTION OF THE DRAWINGS

Other objects of this invention will become apparent from the following description and accompanying drawings wherein.

DESCRIPTION OF THE PREFERRED EMBODIMENTS

Figure 1:
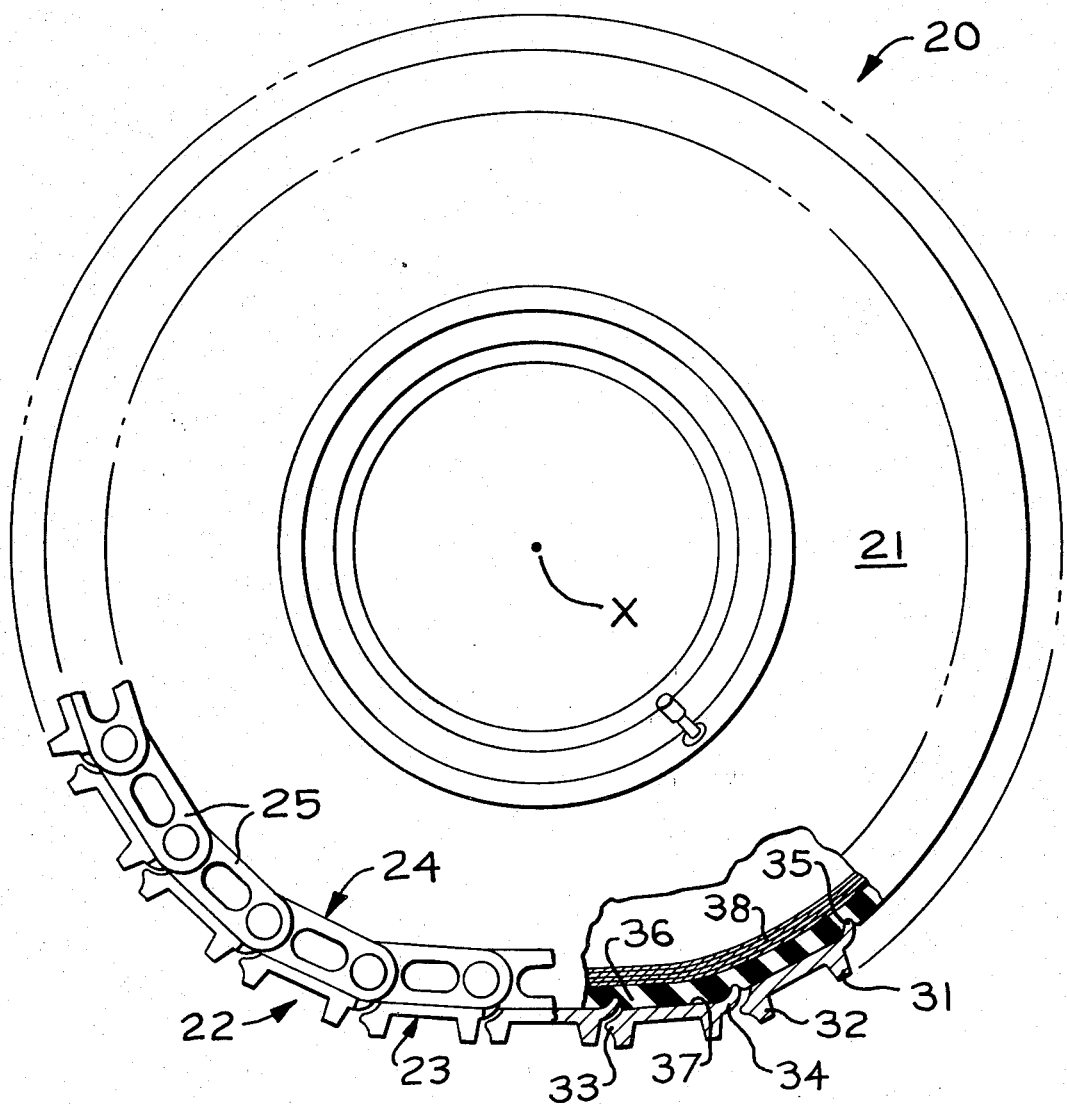
FIG. 1 is a partially sectioned, side-elevational view of a cushioned track employing an anti-slippage means embodiment of this invention therein.

FIG. 1 illustrates a cushioned track 20 adapted to replace conventional tires or the like employed on standard earthworking machines, such as wheel tractor scrapers or loaders. The cushioned track comprises an annular resilient spacer means or tire 21 having a substantially annular and polygonal-shaped endless track assembly 22 mounted completely therearound. The resilient spacer means may comprise an air-inflated rubber tire or air bag, for example, mounted on a conventional rim assembly.

Other suitable types of spacer means are disclosed in U.S. Patent application Ser. No. 884,903, filed on Dec. 15, 1969 by Robert A. Peterson et al. for "Cushioned Track and Method for Driving Same", assigned to the assignee of this application. The rim may be suitably connected to a vehicle drive train (not shown) to be rotated about a central axis X thereof by an internal combustion engine (not shown). The illustrated driver or spacer means embodiment preferably comprises a carcass (not shown) composed of suitably integrated interliner, body and tread plies.

The endless track assembly comprises a plurality of closely coupled ground-engaging shoes 23 circumferentially surrounding the spacer means. The shoes have substantially uniform cross-sections and widths defining outboard portions extending substantially equal lateral distance beyond a respective sidewall of the spacer means. An annular articulated link assembly or connecting means 24 is preferably connected to respective outboard portions of the shoes (FIG. 2) and in slightly spaced relationship relative to a respective sidewall of the spacer means.

Figure 2:
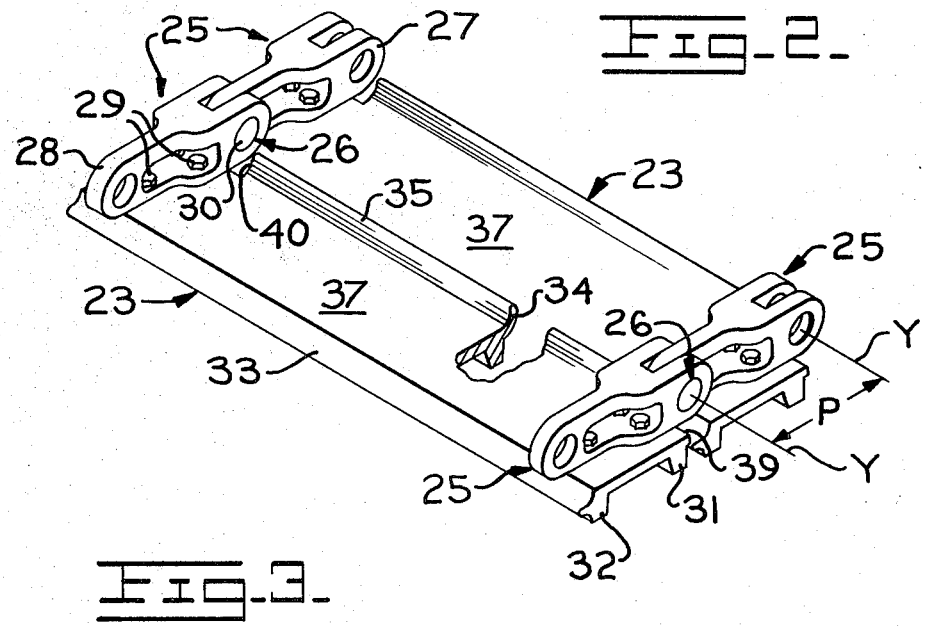
FIG. 2 is an isometric view of a portion of a track assembly employed in the FIG. 1 cushioned track.

The identical link assemblies may be bolted or otherwise suitably connected to radially inner surface portions of the outboard portions of the shoes to closely couple them together (FIGS. 1 and 2). The substantially flat and uninterrupted inner surface portions of the shoes intimately contact and compress a substantial portion of the tread of the spacer means (e.g., at least approximately eighty percent) so that it assumes a substantially circumferentially continuous and polygonal-shaped configuration for driving purposes. Such driving relationship is fully described in above-referenced U.S. Patent application Ser. No. 884,903.

FIG. 2 illustrates a portion of the track assembly as comprising an adjacent pair of identical links 25. Each pair of links are connected together for pivotal movement about a common pivot axis Y by pivot means 26. The illustrated link embodiment is of the fork and blade type comprising a fork end portion 27 positioned to receive a blade end portion 28 of an adjacent link therein.

Each link may be secured to a respective shoe 23 by releasable bolt or securing means 29. The pivot means comprises a pivot pin 30, and preferably a mating bushing (not shown), having its axis Y preferably positioned substantially parallel relative to central rotational axis X of the cushioned track (FIG. 1) and substantially intermediate a respective pair of adjacent shoes connected together thereby. Such arrangement facilitates a close coupling of the shoes together and also permits the shoes to contact the ground at the formed footprint in a substantially smooth and uninterrupted manner.

Figure 3:
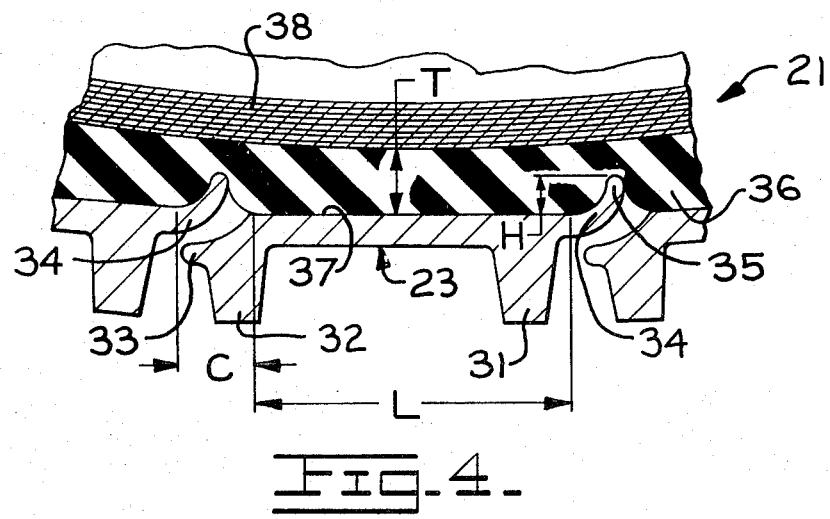
FIG. 3 is an enlarged sectional view, similar to the sectioned portion shown in FIG. 1.

At least one grouser may be integrally formed with the track shoe to extend radially outwardly therefrom. FIGS. 1-3 illustrate two such grousers 31 and 32, each positioned at a respective length-wise end of the track shoe. The grousers are preferably positioned closely adjacent to a respective pivot means 26 to induce a smooth transition of the track assembly at the formed footprint during rotation of the cushioned track over the ground.

Referring to FIG. 3, each track shoe has first and second curved lugs 33 and 34 formed integrally with a respective length-wise end of the track shoe. The complementary lugs function in conjunction with the disposition of pivot pin 30 to completely mask each other during rotation of the cushioned track. In particular, first lug 33 of one shoe will substantially overlap a second complementary lug 34 of an adjacent shoe to protect the spacer means against damage and to prevent dirt infiltration during all phases of machine operation.

This invention primarily relates to the utilization of an anti-slippage means in combination with the above-described cushioned track to normally prevent the spacer means and track assembly from moving relative to each other, circumferentially about rotational axis X (FIG. 1) when driving torque is maintained below a predetermined amount. When such amount is exceeded, slippage will occur automatically to prevent damage to the cushioned track components as will be hereinafter more fully explained. In the FIGS. 1-3 embodiment such anti-slippage means comprises a raised portion 35 of lug 34 which imbeds into tread portion 36 of tire 21 and has a rounded extremity to prevent tire damage.

The spacer means tire embodiment is composed of a reinforced elastomeric material, such as rubber. When the toroidal chamber (not fully shown) of the spacer means is inflated to a predetermined level, tread 36 is compressed against substantial flat inner surface portions 37 of each track shoe. The tread is preferably smooth and uninterrupted and, as suggested above, may comprise a casing or carcass 38 composed of suitably integrated plies.

The plies may be either of a bias angle or radial construction employing standard fabric material such as rayon, nylon, wire and/or polyester. The number of plies will depend upon the particular spacer means application. Rubber or other suitable elastomer may be molded to and suitably combined with the carcass plies in a conventional manner with the plies terminating at and secured to standard reinforced beads (not shown) of the tire.

Lug 34 and anti-slippage means 35, having a uniform cross-section, are relieved at notches 39 and 40 formed at the width-wise ends of each track shoe. Such notches facilitate the flat reception of links 25 on the track shoes (FIG. 2). Anti-slippage means 35 thus extends substantially fully across inner surface portions 37 of the track shoe and radially therefrom to terminate at each end thereof in close proximity to a respective connecting means. The rubber or other suitable elastomer at tread 36 is resilient, but yet sufficiently soft and elastic to be compressed around anti-slippage means 35, as best shown in FIG. 3.

FIGS. 2 and 3 further illustrate dimensional design parameters which have the following definitions:

C = The circumferential length by which tread 36 is interrupted by anti-slippage means 35.
H = The radial height of anti-slippage means 35.
L = The approximate circumferential length of tread 36 which engages track shoe 23.
P = The pitch length between axes Y of adjacent pivot pins 36.
T = The radial, composite thickness of the tire at tread 36.

As suggested above, the anti-slippage means aids the frictional drive prevalent between tread 36 and flat surface portions 37 of the track shoes while yet not interfering therewith nor with the static sealing desiderata. The drive system is dependent on design parameters, such as the coefficient of friction between the tread and track shoes, the composition and physical properties of the tire and the tension in link assemblies 24, which combine to induce the desired drive torque from the tire to the track assembly. The tension in the link assemblies is primarily controlled by the interference fit between the tire and track assembly and the inflation pressure of the tire.

At a given interference fit and inflation pressure, the cushioned track will transmit a given drive torque without incurring slippage between the tire and track assembly. When the drive torque exceeds a predetermined amount, anti-slippage means 35 will resist slippage by increasing the torque capacity of the system due to the absorption of slip inducing energy by the displaced rubber. It can thus be seen that each anti-slippage means 35 individually functions to increase drive capacity and, therefore, the size and number thereof provide means for preadjusting the desired amount of drive torque required to induce slippage.

Each anti-slippage means increases the tension in the link assemblies in proportion to the amount of force required to at least partially submerge it into tread 36. However, it should be understood that the desired tension of the link assemblies, kept at an acceptable minimum to prevent pin scoring, is primarily created by the interference fit between the tread and surface portions 37 of the track shoes. The additive tension induced by the anti-slippage means is relatively low compared thereto.

Further, the anti-slippage means actually reduces the amount of track tension required to prevent slippage for a given torque and broadens the range of the interference fit between the tread and surface portions 37 of the track shoes to create this tension. The range mentioned above is defined as the minimum amount of tension needed to transmit a given torque without incurring slippage and the maximum amount of tension that can be tolerated to prevent pin scoring. For example, if a range of 6 to 10 inches of interference is needed to transmit a given torque without the anti-slippage means in order to prevent slippage and pin scoring, only 2 to 8 inches of interference will be needed to transmit the same torque with the anti-slippage means. These ranges are important because the circumference of spacer members produced from the same mold can vary as much as 3 inches which can easily place the interference fit outside the preceding 6 to 10 inch range.

Thus, the localized compression of the rubber forced around the anti-slippage means develops forces which resist, but do not stop slippage when the torque limit is exceeded. Damage to the tire and track assembly is therefore prevented. Also, the driving and static sealing conditions illustrated in FIG. 3 are automatically re-established subsequent to slippage.

The height H, circumferential length C and circumferential spacing of the anti-slippage means about the cushioned track must insure that the substantial driving contact between tread 36 and surface portions 37 of the track shoes will be maintained continuously. For example, if such height is too pronounced and/or such spacing is too limited, the tread will tend to ride on the anti-slippage means to prevent the desired driving contact. Conversely, if height H is too limited, for example, the anti-slippage desiderata would not be achieved.

Height H may also be related to thickness T, pin pitch P and circumferential length L. In most cushioned track design applications under consideration, H/T would be less than 0.75 and preferably within the range of from 0.1 to 0.5. Such range will normally provide adequate tread penetration, but yet prevent damage to the tire and integrated carcass plies.

The ratio H/P may be selected from the range of from 0.027 to 0.186 and preferably from the range of from 0.062 to 0.078. Since circumferential length L closely approximated pin pitch P, such ranges also substantially apply to a H/L ratio. The latter ranges further assure the above-described driving desiderata.

Figure 4:
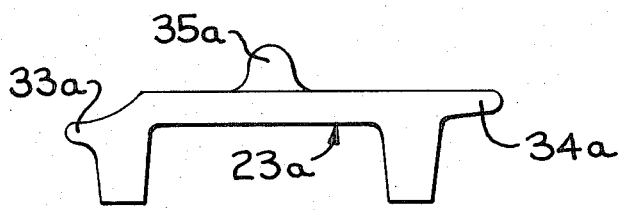
FIG. 4 is an end elevational view of a track shoe having a second anti-slippage means embodiment formed integrally therewith.

FIG. 4 illustrates another embodiment of this invention wherein structures corresponding to those illustrated in FIGS. 1-3 are depicted by like numerals, but with the latter numerals each being accompanied by an $a$. A like numbering procedure is employed for the further described embodiments of FIGS. 5-8, but with the numerals appearing therein being accompanied by successive lower case letters $b$ through $d$. The components illustrated in the latter figures may be substituted in lieu of corresponding components employed in the FIG. 1 cushioned track.

The FIG. 4 track shoe 23a primarily differs from track shoe 23 (FIGS. 1-3) in the relative location of an anti-slippage means 35a thereon. In particular, the FIG. 4 anti-slippage means is formed integrally with the track shoe and positioned at least approximately intermediate the length-wise ends thereof. Lug 33a remains the same whereas lug 34a is substantially flattened.

Figure 5:
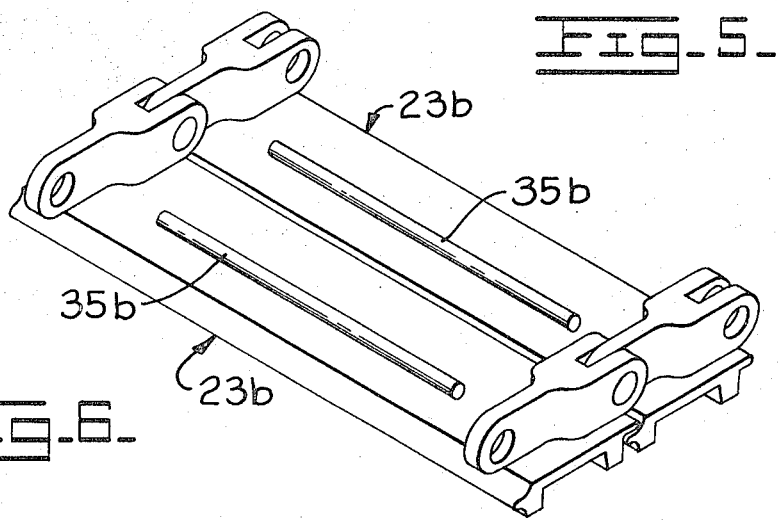
FIGS. 5 and 6 are isometric and sectional views similar to FIGS. 2 and 3, respectively, but illustrating a third anti-slippage means embodiment.
Figure 6:
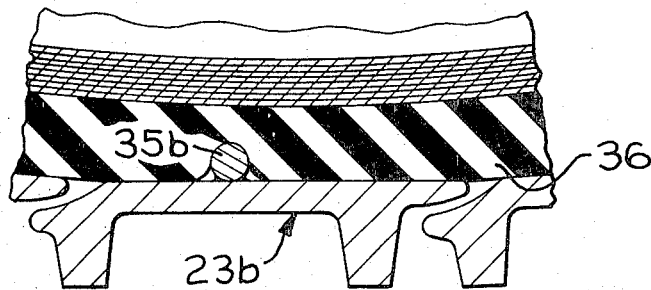
Figure 7:
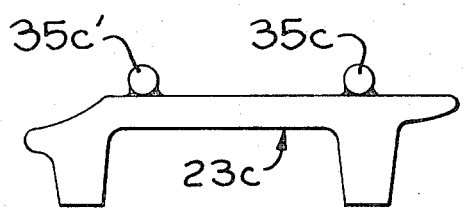
FIG. 7 is an end elevational view of a track shoe employing a fourth anti-slippage means embodiment thereon.

The FIGS. 5 and 6 embodiment differs from the FIG. 4 embodiment in that the anti-slippage means comprises a round rod 35b welded to each track shoe 23b. As best shown in FIG. 6, the rod will imbed into tire tread 36 in substantially the same manner as anti-slippage means 35 (FIG. 3). The FIG. 7 embodiment differs from the FIGS. 5 and 6 embodiment in that two round and spaced rods 35c and 35c' are welded to a track shoe 23c.

Figure 8:
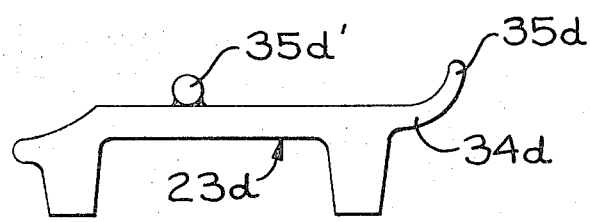
FIG. 8 is an end elevational view of a track shoe employing a fifth anti-slippage means embodiment thereon.

The FIG. 8 embodiment essentially combines the features of the FIGS. 1-3 and FIGS. 5 and 6 embodiments. In particular, a first anti-slippage means 35d comprises a curled end portion of a lug 34d whereas a second anti-slippage means comprises a round rod 35d' welded to the track shoe.

What is claimed is:

1. A cushioned track comprising
    an annular resilient spacer means, normally having a substantially smooth and uninterrupted annular tread formed thereon composed of an elastomeric material, mounted for rotation about a central axis thereof, and
    an endless track assembly circumferentially mounted completely around said spacer means, said track assembly comprising
    a plurality of closely coupled ground-engaging shoes having substantially flat inner surfaces circumferentially surrounding said spacer means and
    annular connecting means connected to said shoes to closely couple them together and to uniformly compress the substantially flat inner surfaces of said shoes into intimate contact with said annular tread to form a substantially circumferentially continuous and polygonal-shaped surface contact therewith,
    at least some of said shoes each having anti-slippage means secured thereon to extend substantially fully across inner surface portions of such shoes to terminate at each end thereof in close proximity to a respective connecting means and radially inwardly theretowards deflecting said annular tread into substantial enveloped relationship around said anti-slippage means for normally preventing relative rotational movement between said annular spacer means and said track assembly, said annular tread being sufficiently soft and resilient to permit such enveloped relationship and wherein the ratio of the radial height of said anti-slippage means to the radial, composite thickness at the tread of said spacer means is selected from the range of from 0.1 to 0.5.

2. The invention of claim 1 wherein an anti-slippage means is secured to each of said shoes.

3. The invention of claim 1 wherein the radially inward extremity of said anti-slippage means is rounded to induce envelopment of said tread therewith and to prevent abrasion thereof.

4. The invention of claim 1 wherein said anti-slippage means is positioned between the circumferential length-wise ends of said shoe.

5. The invention of claim 1 wherein said anti-slippage means comprises only one narrow rod secured to each of said shoes between the circumferential length-wise ends thereof.

6. The invention of claim 1 wherein said anti-slippage means comprises only two narrow and spaced rods secured to each of said shoes between the circumferential length-wise ends thereof.

7. The invention of claim 1 wherein the ratio of the radial height of said anti-slippage means to the pitch length between axes of each adjacent pair of pivot pins is selected from the range of from 0.027 to 0.186.

8. The invention of claim 1 wherein said spacer means comprises an air-inflated and reinforced elastomeric member and said connecting means comprises a connecting means positioned on each side of said spacer means, adjacent to a respective sidewall thereof, and attached to radially inner surface portions of said shoes, each of said connecting means comprising an articulated link assembly having a plurality of links and a pivot pin pivotally connecting each circumferentially adjacent pair of links together.

9. The invention of claim 2 wherein each of said link assemblies comprises a plurality of single links with each circumferentially adjacent pair of links being overlapped and connected together by said pivot pin, one of said links attached to each one of said shoes, each of said links comprising a fork end portion and an opposite blade end portion, the blade end portion of one link of each adjacent pair of links being pivotally mounted within the fork end portion of the second link thereof by a pivot pin having its longitudinal axis positioned substantially parallel relative to said central axis and further positioned substantially intermediate a pair of adjacent shoes.

10. The invention of claim 8 wherein said anti-slippage means has a uniform cross section.

11. The invention of claim 1 further comprising complementary first and second lug means formed at a respective length-wise end of each shoe, said anti-slippage means comprising an end portion of each of said second lug means.

12. The invention of claim 11 wherein said anti-slippage means further comprises a narrow rod secured to each of said shoes, adjacent to said first lug.

* * * * *